No. 753,137.

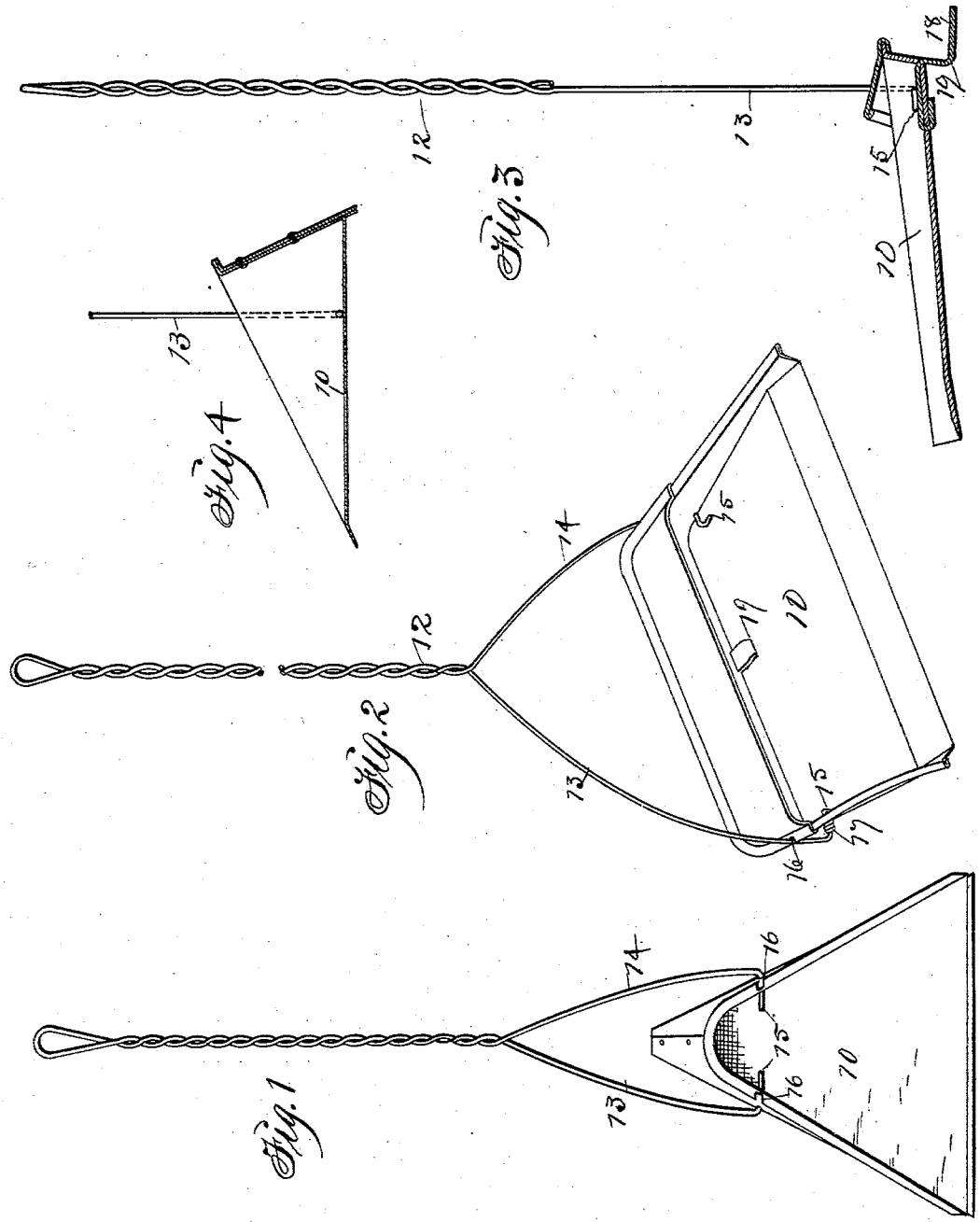

Patented February 23, 1904.

UNITED STATES PATENT OFFICE.

WARD H. HILLS, OF DES MOINES, IOWA.

DUST-PAN.

SPECIFICATION forming part of Letters Patent No. 753,137, dated February 23, 1904.

Application filed July 11, 1903. Serial No. 165,194. (No model.)

*To all whom it may concern:*

Be it known that I, WARD H. HILLS, a citizen of the United States, residing at Des Moines, in the county of Polk and State of Iowa, have invented a new and useful Dust-Pan, of which the following is a specification.

My object is to provide a dust-pan with an adjustable handle adapted to facilitate the use of the pan and also especially adapted for hanging the pan against a wall to protect it and retain it in a convenient position when not in use.

My invention consists in the construction, arrangement, and combination of parts, as hereinafter set forth, pointed out in my claim, and illustrated in the accompanying drawings, in which—

Figure 1 shows the bottom of a pan, that is made of a four-cornered piece of sheet metal, and the handle in position, as required, for hanging it on a nail to rest against the wall in which the nail is fixed. Fig. 2 is a perspective view showing the handle in position as required for using the pan advantageously. Fig. 3 is a transverse sectional view of the pan and shows how a heel is fixed to its rear end. Fig. 4 is a longitudinal sectional view of Fig. 1 that shows the preferred form of pan.

The numeral 10 designates the body portion of a dust-pan made of sheet metal.

The triangular-shaped pan shown in Figs. 1 and 4 and made by bending a single piece of sheet metal into form, as shown, and riveting the overlying rear edges together is advantageous in that it is easily made, and by bending the point downward a finger-hold *a* is produced that facilitates handling the pan and adjusting the handle as required in practical use.

A handle 12, made of a single length of wire doubled and twisted together and its end portions 13 and 14 spread apart is adjustably connected with the rear side portions of the pan in such a manner that the forked branches of the wire will by their spring force engage and clasp the sides of the pan. Their end portions are bent inward and extended through perforations in the side of the pan and then bent forward at right angles to produce stops 15, that will rest upon the pan to aid in retaining the handle in an upright position, as shown in Figs. 2 and 3, and to retain the handle locked in such upright position notches 16 are formed in the edge of the pan, as shown in Figs. 1 and 2, to admit the branches 13 of the handle, that will by their resiliency press into the notches required to automatically lock the handle to the pan.

Sleeves 17, in the form of wire coils, may be placed on the inwardly-extending parts of the branches of the handle to restrict the inward movements of the handle as required to aid in keeping the branches of the handle in proper position when adjusted for handling the pan in practical use.

By forming notches in the edges of the pan and extending the ends of the branches of the handle through apertures in the sides of the pan and bending their extremities forward at right angles the handle can be securely retained in proper position, as required for practical use, without attaching any device for holding the handle in a fixed vertical position.

A heel 18 made of a single piece of sheet metal 19, bent into form, as shown in Fig. 3, is extended through a slot at the bottom and center of the rear end of the pan and its front end then passed through a slot in the pan and bent backward and pressed flat against the bottom of the pan, and thereby securely fastened to the pan as required to retain the rear of the pan elevated and the front edge close to the surface of the carpet or floor from which dirt is to be swept into the pan.

To unlock the handle, as required, to replace it in position for hanging up the pan, the branches 13 need only be pressed out of the notches 16 to allow the wire to slide backward over the edge of the pan to extend in alinement with the pan, as shown in Fig. 1.

To hang the dust-pan on a nail in a wall, the handle is released from the notches in its side edges, and the pan will then by force of gravity assume a pendent upright position as the rear end of the pan moves forward relative to the handle, so the bottom of the pan will be flat against the wall.

I am aware fastening devices adapted to detachably engage the branches of a forked handle pivotally connected with a dust-pan have been fixed to the outside of a pan; but making such extraneous devices and fixing them to a pan involves additional expense for material and labor and increases the cost of production. I am also aware a forked handle has been hinged to the outside of a pan by means of eyes fixed to the outside of a pan. Such connection of the handle also requires additional labor and expense and increases the cost of the pan, and my manner of making notches in the edge of the pan and perforations in the lower portion of the sides and then pivotally connecting the handle with the pan by bending the ends at right angles and passing them in through the perforations and then bending their extremities forward to engage the pan as required to prevent the handle from turning forward is greatly advantageous in saving time and labor and expense in manufacturing the pans and also advantageous in handling and operating the pan.

Having thus described the purpose of my invention, its construction and operation, the practical utility thereof will be obvious to persons familiar with the use of dust-pans, and what I claim as new, and desire to secure by Letters Patent, is—

A dust-pan having side walls and a rim extending outwardly from the top of said walls, a wire handle bifurcated at the lower end, the ends of said handle being bent at right angles passed through spacing-sleeves, and then extended into the the pan through apertures in the side walls thereof, whereby said handle is pivoted to turn into approximately the plane of the pan-bottom, notches in said outwardly-extending rim positioned to engage the branches of said handle and to hold the same releasably in operative position; the extremity of one of the branches being bent forward at right angles within the pan, said bent portion being adapted to engage the bottom of the pan to prevent rotation of the handle in a forward direction.

WARD H. HILLS.

Witnesses:
L. L. LEIBROCK,
THOMAS G. ORWIG.